July 6, 1948.  R. J. HERBOLD  2,444,442
PHOTO-ELECTRIC APPARATUS
Filed June 29, 1946  2 Sheets-Sheet 1

Inventor
Robert J. Herbold
By Clayton R. Jenks
Attorney

July 6, 1948. R. J. HERBOLD 2,444,442
PHOTO-ELECTRIC APPARATUS
Filed June 29, 1946 2 Sheets-Sheet 2

Witness
Herbert E. Covey

Inventor
Robert J. Herbold
By Clayton P. Jenks
Attorney

Patented July 6, 1948

2,444,442

UNITED STATES PATENT OFFICE 2,444,442

PHOTOELECTRIC APPARATUS

Robert J. Herbold, Denver, Colo., assignor to Lafayette M. Hughes, Denver, Colo.

Application June 29, 1946, Serial No. 680,491

8 Claims. (Cl. 250—41.5)

This invention relates to photoelectric apparatus and more particularly to apparatus adapted for measuring sizes, distance or other positional variations.

In my prior pending application, Serial No. 582,918, filed March 15, 1945, I have described electronic apparatus in which a photoemissive tube has a vertically tapered cathode arranged to receive a narrow light beam passing through a horizontal slot in a shield and wherein the area of activation of the tapered cathode varies in accordance with the position of the light on the cathode as determined by the directive angularity of the light ray passing through the slot. That special type of phototube is balanced in a bridge circuit with a standard phototube which receives an invariable activation, so that any change in the direction of the light beam relative to the tubes may serve to control the grid potential of an amplifier tube and thus govern other electrical apparatus.

A primary feature of the invention is to provide photoelectric apparatus in which a large and invariable area of photosensitive material may be activated by light which varies in intensity in accordance with the directive angularity of a light beam.

A further object is to employ, for making such angularity determinations, any one of the different types of photosensitive elements, whether photovoltaic, photoconductive or photoemissive. Other objects will be apparent in the following disclosure.

The emission of electrons from the light sensitive element of a photocell is proportional, other conditions being equal, to the intensity of the light that illuminates the element, up to the point of light saturation thereof.

In accordance with this invention, I so arrange opaque shields and light openings therethrough that the intensity of light received by a photosensitive element is varied in accordance with the directive angularity of the light.

Referring to the drawings illustrating one embodiment of this invention:

Fig. 7 is a wiring diagram of photoelectric apparatus and associated circuits arranged for measuring effects produced by a variation in the directive angularity of a light beam.

Figure 5:
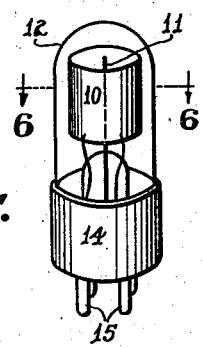
Fig. 5 is an elevational view of the photoemissive tube.
Figure 6:
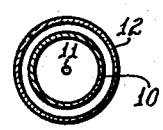
Fig. 6 is a section on the line 6—6 of Fig. 5.

Referring first to Figs. 5 and 6, I have there shown a photoemissive tube of either the vacuum or the gas filled type in which the cathode 10 is a cylindrical body surrounding an anode wire 11. The cylindrical cathode has its photosensitive material on the outside, and thus provides a very extensive surface, as permitted by the size of the enveloping glass tube 12, for receiving light rays directed to it from all lateral directions. This photoemissive structure may be replaced by photovoltaic or photoconductive elements similarly arranged to receive light radiation from all sides. The shape of the photosensitive element may be widely varied. For example, it may be substantially spherical so as to receive light rays from nearly every direction. The phototube shown in Figs. 5 and 6 may be made in accordance with standard practice to provide a supporting base 14 and the prongs 15 which are arranged to give the required electrical connections between the elements 10 and 11 and other apparatus, as will be well understood.

I propose to illuminate that large surface of the photosensitive element by a variable light intensity in accordance with the directive angularity of a light ray. To this end, I so arrange openings in shields that the cross sectional area of a light ray varies with such angularity; and since the major portion of the light that passes the shields is employed to activate all of the surface of the light sensitive element, then the light intensity depends on that cross sectional area of the light ray. The shields with their light openings form a translucent window, which may be light diffusing if desired, that transmits light to the photosensitive element from the light of variable angularity.

Figure 1:
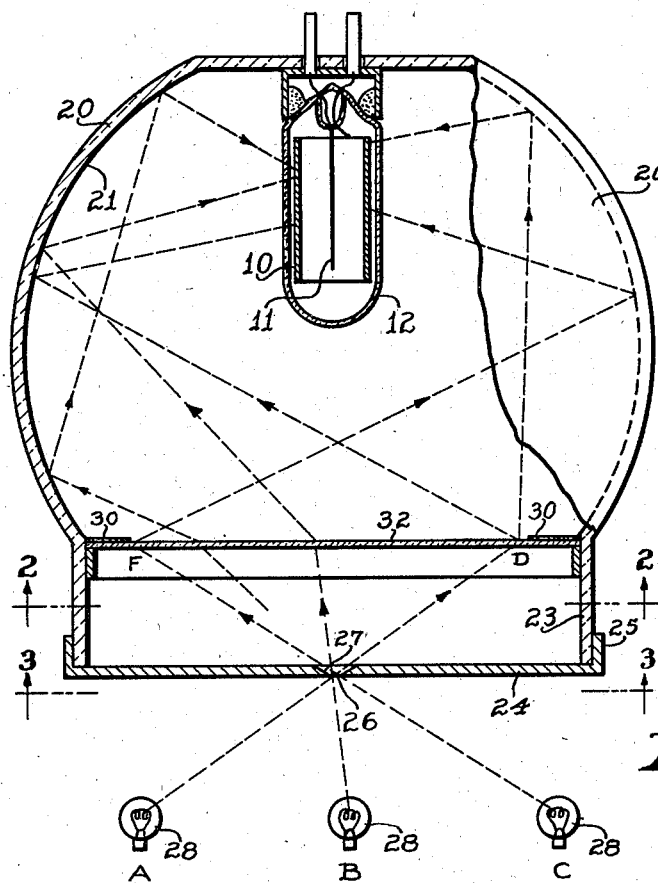
Fig. 1 is a vertical section, partly broken away, showing the assembled shields, the light reflecting globe and a photo sensitive element.
Figure 2:
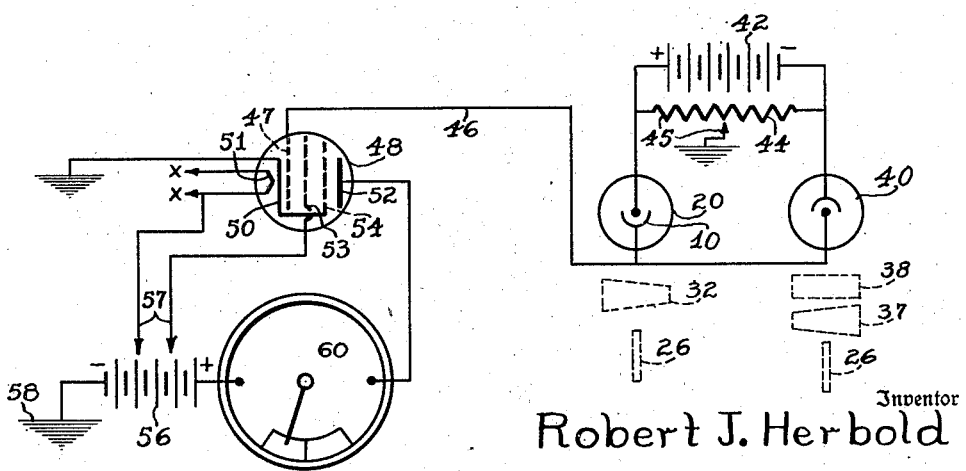
Fig. 2 is a section taken on the line 2—2 of Fig. 1.
Figure 2:
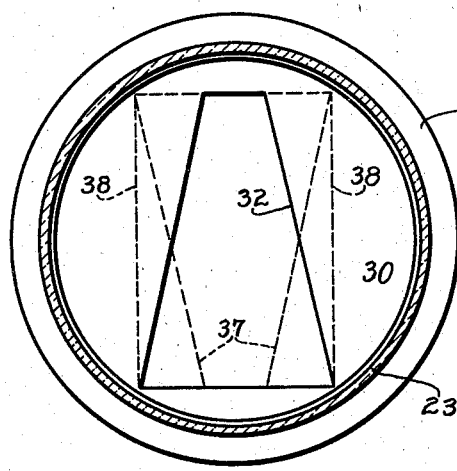
Figure 3:
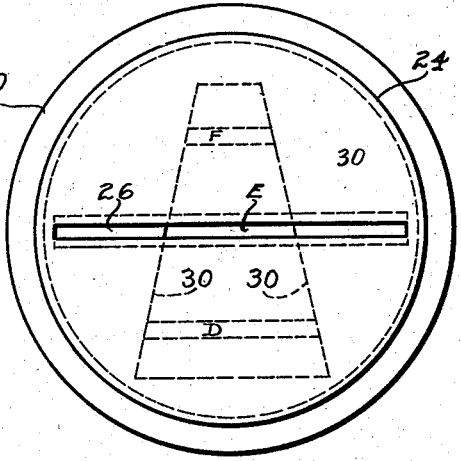
Fig. 3 is a view taken on the line 3—3 of Fig. 1.

One preferred construction which embodies this principle is shown in Figs. 1 to 3 inclusive. In that structure, the phototube 12 is mounted within a globe 20 which may be substantially or partly spherical, as illustrated. This globe may be made of glass or metal or other desired material. The inner surface 21 of that globe is light reflective, and this is accomplished, for example, by silvering the inner surface of a glass globe like an ordinary mirror. The globe 20 terminates at its lower end in a cylindrical portion 23 having its open end resting in a metal cup 24 whose side flanges 25 position the globe.

The circular opaque disk that forms the bottom of the cup 24 forms a light shield. It is provided with a long, narrow slot 26, shown particularly in Figs. 1 and 3, which may be 0.1 to 0.25 inch or more in width. The slot has upwardly flaring walls 27 extending from the lower face of the cup and thereby providing a knife edge opening of a desired width for the passage of light. A light ray from a suitable source of light 28, when it is in the positions A, B and C, will pass as a narrow band through the slot 26 into the lower cylindrical portion 23 of the globe. That band of light has its cross sectional area determined by the width and length of the slot. In order that there may be a variation in the quantity or intensity of light received within the globe as the angularity of the light changes from position A to position C, I provide an opaque shield 30 provided with a central area 32 made of a translucent or transparent material and preferably ground or frosted glass or other substance that is capable of diffusing the light passing therethrough. This translucent area is shaped to taper at right angles to the length of the slot 26, as shown particularly in Fig. 3. The outer opaque portion may be formed in a suitable way, such as painting the ground glass 30 with a layer of a black material which will not transmit light, or it may be formed of a separate disk of metal laid over the ground glass. The tapered translucent portion 32 is so arranged that when the light is in the position A, the narrow band of light rays that pass through the slot 26 will strike the ground glass 30 in the position D of Fig. 3 and in the position E for the centralized location B of the light and in the light receiving position F for the light position C. Thus it will be seen that the band of light that strikes the ground glass 30 becomes increasingly shorter, although of substantially the same width, as the light moves from position A to C and the light band travels from D to F on the translucent screen 32. Hence a greater amount of light gets into the reflecting globe when the lamp 28 is in position A than when it does when in position C, or the light intensity is thus varied.

The light is diffused by the ground glass 32 and scattered in all directions within the globe, and it is reflected back and forth by the inner reflecting surface of the globe until it ultimately impinges on the light activated surface of the cathode 10 and thus changes its photoactivity. The dotted lines within the globe indicate some of the paths of reflection of the diffused light. The globe and the location of the cathode may be so arranged that most of the light entering the globe ultimately reaches the sensitive cathode. Hence the activation of the cathode will be primarily dependent on the light intensity as determined by the length of the light band D, E or F.

Figure 4:
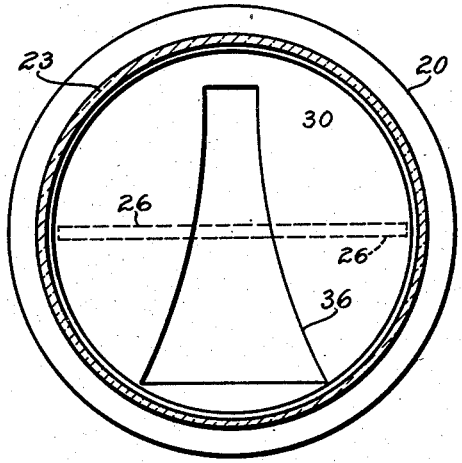
Fig. 4 shows a variation of structure corresponding with Fig. 2.

It will also be evident that the tapered opening 32 may be varied, such as is shown by the curve slot wall 36 shown in Fig. 4, so that the the calibration of the electrical instruments governed by the phototube may be varied by the shape of the tapered slot.

If a photosensitive selenium resistance element is employed in place of the cathode 10, then the sensitive material will be similarly arranged on a cylindrical or spherical or other shaped surface, and the required connections will be made with this resistance element as is well understood. Likewise, a photovoltaic element may have its photosensitive element on the outside located the same as the cylinder 10 of Fig. 5 and the other electrode may be located within the same. That is, each photoelement is so arranged that it receives light from more than one side, and preferably from the major portion of the spherical angle apexed at the element.

Although a single shielded photocell, as above described, has various uses, I prefer to employ a pair of balanced cell and globe units, as shown in Fig. 7. One unit 20 is made as above described. The other unit 40 may be similarly made but have the tapered opening 32 reversed relative to the first cell as shown at 37 in Figs. 2 and 7, so that as one cell gets more light, the other receives less. Also, the second cell may have a rectangular opening in place of the tapered slot, as shown at 38 in dotted outlines in Figs. 2 and 7. In such a unit having the rectangular opening 38, a light band does not vary in width with the angularity of the light. Hence, the globe of unit 40 may have either shape of slot 37 or 38. The two cells of the units 20 and 40 have photosensitive elements of equal or mathematically related areas and are otherwise similar in their photosensitive and electrical characteristics; hence they are activated only in accordance with the intensity of the light within the globe which enters through the slots 26.

As shown in Fig. 7, these two cell units 20 and 40 may be arranged in an electronic circuit comprising a battery 42 having its terminals connected respectively to the anode of cell unit 20 and the cathode of cell unit 40, the other two electrodes being connected together so that one cell forms a load for the other in this power circuit. A variable potentiometer resistance 44 connected across the battery terminals is grounded through a movable contact arm 45. A common terminal wire 46, which connects with the cathode of unit 20 and the anode of unit 40, serves to vary the potential of the grid 47 of an amplifier tube 48 of standard structure, such as a pentode. The cathode 50 of that tube may be suitably heated by a heater 51 connected with an external source of power, and the electron emission from the cathode is received by an anode plate 52 after it has passed the screen and suppressor grids 53 and 54 of the pentode, all of which may be in accordance with standard construction. The cathode 50 is grounded as illustrated, and current is supplied from a battery 56 connected with the multiple variable contacts 57 to the heater circuit and the grid 53. One terminal of the battery is grounded at 58 and the other terminal of the battery and the anode 52 of the amplifier are connected with a suitable indicating instrument, such as a milliammeter or galvanometer 60. The electrical circuits are so adjusted and the meter is calibrated so as to give any desired measurement, as governed by the light angularity. The potentiometer adjustment at 45 may be employed to balance the circuit and give a zero or other desired reading when the light is at one of the end portions A or C. If one tube receives more light than the other, its resistance decreases and the voltage distribution between the two tubes changes and thus varies the grid potentials of the amplifier tube. This takes place when the light moves from position C to position A.

The inner surface of the casing or globe 20 may be coated with a fluorescent material that is excited by ultra violet light. If the light A is predominant in infra red rays, then the photoactivity is dampened or decreased by infra red light.

Then an increase of the area of the band D, E or F that passes into the globe decreases the light activation. The loss of light intensity due to absorption by the frosted glass 30 and the walls of the globe or photoelement casing is more than compensated by the fact that a very large area of photosensitive surface may be activated by this arrangement of the parts. Moreover, the use of such a large area of photosensitive material minimizes any error due to irregularity of chemical composition of the cathode, as would result if the light band D, E or F were applied directly to that photosensitive element only in a narrow area. The nature of the reflective surface 21 of the globe may be varied, depending upon the wave lengths of the light.

This construction may be employed to make measurements of the altitude of an aircraft in accordance with the procedure set forth in my prior patent application, in which the balanced photoelements are arranged to observe a line of lights that extends lengthwise of and parallel with the center line of the airport runway or an extension thereof. The line of lights may be arranged at a definite distance from the runway, and the instrument 60 is calibrated to triangulate the directive angularity of the light ray in terms of altitude. For example, if the aircraft is 200 feet above the runway and the lights are 200 feet distance from the runway center line, the measurement angle of 45°, as determined by the position of the light 28 (Fig. 1), will indicate an angle of 45°, and this is translated by instrument 60 as altitude. When the aircraft is on the ground, the photoelement and its associated shield are arranged to receive a horizontal ray of light that gives the minimum or the maximum of photoactivation, depending upon the relative positions of the parts, which is translated as a zero measurement. The axis of the photocell and the slot 26 aligned therewith may be arranged at an angle of 22½° to a vertical line, so that the photoelement may view the light from these end positions as the aircraft descends.

Other features set forth in my prior application may be incorporated in this construction, such as the use of chopped light which is modulated to a given frequency, in which case the electronic circuits include a band pass filter arranged to pass only a pulsating D. C. current having a frequency within a narrow band including that of the modulated light. High and low pass filters of standard types may be employed for the purpose. If the apparatus is to be used under adverse weather conditions, such as fog, rain or snow, then the use of infra red light is desirable, and the reflecting surface of the globe may be either coated with fluorescent material or left clear and capable of reflecting the major portion of the infra red rays.

The construction may also be employed in various industrial relations. For example, it will determine whether tin cans on a travelling conveyor belt are of the same height. In that case, a beam of light is reflected successively from each can to the window which transmits light to the interior of the light reflecting casing 20. The electronic circuit is balanced for a given height of can, but if a shorter can appears in front of the window slot 26, then a narrower angle of light is reflected through the slot to the tapered opening 32 and thus gives less illumination than does the full sized can. Similarly, the height of opaque bodies may be measured by having the opaque body cut off a part or all of the light to the photoelement if it is of the right size, but permitting light to pass when too low to intercept all of it. If no light passes for a normally sized article, then the indicator 60 reads zero, but if light strikes the photosensitive element, then the reading of the indicator will depend upon the included angle of the pencilled light that passes into the light reflecting casing 20. Many other applications of this invention may be made.

Various types of photoemissive tubes may be arranged to provide the extensive, and preferably annular, photosensitive element which is to be activated simultaneously on all of its surface by the light that varies in intensity. One construction has its sensitized cathode surface made of caesium on caesium oxide applied to a base of silver. A General Electric argon gas filled PJ23 tube of this type is sensitive to wave lengths from about 3,000 and 12,000 Angstrom units and is useful with infra red light. Also, I may use a photovoltaic cell, such as a copper oxide cell or a Weston photronic cell, in which the sensitive element is arranged annularly. I may use a thalofide photoconductive cell having a cylindrical platinum disk provided with an outer sensitive resistance film of thallium metal treated with oxygen and sulfur to make it sensitive to light. I may use a photoconductive cell having an annular member carrying a resistance element formed of a film of chemically precipitated sulfide of lead heated in the air at 100° C. Such a cell is very sensitive to infra red light at −80° C. Many other photocell constructions may be employed in association with the light reflecting casing and the associated window; and the latter may be modified in their construction provided they transmit light for activating the photoelement which varies in intensity in accordance with the directive angularity of the light. That angularity may vary either in the direction of a light pencil such as is used in the altitude measurement of an aircraft or in the included angle of a bundle of light rays emanating from an extensive light source area, as is the case where the height of a reflecting tin can is being measured. Hence, the constructions may be varied in accordance with the intended use. Also the structure of the reflective wall, the light window and the associated shields may be varied, as well as the electrical circuits and apparatus governed by the photronic element.

Therefore, the above disclosure is to be interpreted as setting forth the principles of my invention and preferred embodiments thereof and not as imposing limitations on the appended claims.

I claim:

1. Photoelectric apparatus comprising a photocell having a light activated surface, means including a light shield having a window for transmitting light to substantially all of said surface of the element which causes the intensity of light derived from a given source to vary with the directive angularity thereof relative to the window, and apparatus governed by activation of said element in accordance with a variation in said directive angularity.

2. Photoelectric apparatus comprising a casing having an interior light reflecting surface, a photocell therein having a light activated element arranged to receive the reflected light, means including a light diffusing, translucent window which admits light to the casing interior and varies the light intensity in accordance with the directive angularity of a light ray relative to the window, and electrical apparatus governed by said activated element.

3. Photoelectric apparatus comprising a photosensitive element having a light activated surface, an opaque shield having a long, narrow slot for the passage of light waves from a source of light, a second shield having a tapered light opening arranged at an angle to the slot so that the width of a light band passing through the two shields is determined by the directive angularity of the light, and means for transmitting the light simultaneously to substantially all of the surface of the photosensitive element so that the light intensity received by the element varies with said angularity.

4. Photoelectric apparatus comprising a photocell having an annular element provided with a light activated surface, a light reflecting wall surrounding said annular element and having a tapered opening for admitting light to the wall for reflection to the photoelement, an opaque wall providing a slot arranged transversely relative to the tapered opening so that light which varies angularly relative to the slot is transmitted to the reflective surface and provides a light intensity which varies with the angularity of the light, and an electric circuit governed by said element.

5. Photoelectric apparatus comprising a cell having a photosensitive element facing outwardly in an annular arrangement, a casing having an inner light reflective surface surrounding and transmitting light to the element, an opaque wall having a tapered opening for admitting light to the interior of the casing and an opaque wall outside thereof having a long, narrow slot arranged transversely of the taper so that the intensity of light reflected to the element within the casing is governed by the width of the band of light passing through the tapered opening as determined by the angularity of a light ray directed toward the same.

6. Photoelectric apparatus comprising a hollow casing having an interior light reflective surface, a photronic cell having a light activated element arranged to be activated by light reflected from said surface, an opaque shield providing a tapered opening for admitting light to the interior of the casing, an outer shield having a long, narrow slot arranged transversely of the taper of said opening, and a translucent light diffusing medium in the path of light that passes through the tapered opening, and electrical apparatus governed in accordance with the intensity of light received by the photo element.

7. Photoelectric apparatus comprising a photocell having a light sensitive element, a light reflecting casing substantially surrounding the element and having a tapered window for the admission of light and its reflection to said element, an opaque wall providing a narrow slot arranged transversely relative to the taper of said window so that light from a source varying angularly relative to the element is admitted as a band of variable size and thereby provides a variable light intensity within the reflective casing, means providing a balanced electric circuit including said photoelement for a given light angularity, and electrical apparatus governed by an unbalance in said circuit due to a change in light angularity.

8. Photoelectric apparatus comprising a casing having its interior coated with fluorescent material, a photocell having light sensitive material arranged to receive light reflected from said surface, means including a window for transmitting light to said fluorescent material and varying its intensity in accordance with the directive angularity of the light relative to the window and electrical apparatus governed by the activation of the element by said light.

ROBERT J. HERBOLD.

REFERENCES CITED

The following references are of record in the file of this patent:

UNITED STATES PATENTS

| Number | Name | Date |
|---|---|---|
| 2,013,594 | Zworykin | Sept. 3, 1935 |
| 2,136,223 | Thomas | Nov. 8, 1938 |

FOREIGN PATENTS

| Number | Country | Date |
|---|---|---|
| 506,596 | Great Britain | June 1, 1939 |